United States Patent [19]
Neefe

[11] Patent Number: 4,903,052
[45] Date of Patent: * Feb. 20, 1990

[54] METHOD OF MAKING AN IMPROVED DYED COLOR CHANGE CONTACT LENS

[75] Inventor: Charles W. Neefe, Big Spring, Tex.

[73] Assignee: Sunsoft Corp., Albuquerque, N. Mex.

[ * ] Notice: The portion of the term of this patent subsequent to Sep. 19, 2006 has been disclaimed.

[21] Appl. No.: 231,678

[22] Filed: Aug. 11, 1988

Related U.S. Application Data

[63] Continuation-in-part of Ser. No. 147,148, Jan. 22, 1988, abandoned, which is a continuation-in-part of Ser. No. 869,583, Jun. 2, 1986, which is a continuation-in-part of Ser. No. 832,381, Feb. 24, 1986, abandoned.

[51] Int. Cl.$^4$ .................................................. G02B 7/04
[52] U.S. Cl. .......................................... 351/162; 8/507
[58] Field of Search ............................. 351/162; 8/507

[56] References Cited

U.S. PATENT DOCUMENTS

| | | | |
|---|---|---|---|
| 3,476,499 | 11/1969 | Wichterle | 351/162 |
| 3,557,261 | 1/1971 | Wichterle | 351/162 |
| 4,460,523 | 7/1984 | Neefe | 351/162 |

*Primary Examiner*—Bruce Y. Arnold
*Assistant Examiner*—Terry S. Callaghan

[57] ABSTRACT

The invention is a method of making a cosmetic contact lens that changes the apparent color of the eye. This is accomplished by dying the iris area of the convex lens surface the desired transparent color. The convex surface is expanded by a swelling agent. The swelling agent increases the pore size allowing the precipitating solution to move deeper into the convex lens surface below the dyed surface layer. The precipitating solution is reacted to form an insoluble light reflecting layer. When the lens is placed on the eye, the opaque light reflecting layer is viewed through the transparent dyed surface layer changing the apparent color of the eye.

17 Claims, 2 Drawing Sheets

METHOD OF MAKING AN IMPROVED DYED COLOR CHANGE CONTACT LENS

This a continuation in part of application Ser. No. 147,148 filed January 22, 1988 by Charles W. Neefe entitled "DYED EYE COLOR CHANGE CONTACT LENS" now abandoned.

Which this is a continuation in part of application Ser. No. 869,583 entitled "AN EYE COLOR CHANGE CONTACT LENS" filed 06/02/86 now U.S. Pat. No. 4,738,520 which is a continuation in part of application Ser. No. 832,381 entitled "EYE COLOR CHANGE CONTACT LENS BLANK" filed 02/24/86 by Charles W. Neefe now abandoned.

The desire to change and enhance the apparent color of the eye was recorded by the Egyptians five thousand years ago. Cosmetic makeup for the eye area accounts for the larger percentage of the cosmetic sales today.

It is well known that a transparent colored contact lens will not change the color of a dark brown eye.

Several contact lenses have been produced in an effort to achieve cosmetic eye color change of a dark eye.

One attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge. (U.S. Pat. No. 3,454,332 - Siegel).

A third generation of colored lenses provided a thin layer of colored opaque markings placed in a clear material. The opaque colored markings radiated from the center of the clear material in a geometric pattern.

PRIOR ART:

Fuhrman 4,558,931 discloses a cosmetic lens blank having horizontal colored layers through which a contact lens is cut from the blank.

Wichterle 3,679,504 discloses a method of painting colored patterns between two hydrogel layers.

Spivack 3,536,386 discloses iris patterns sanwiched between two lens members.

Borowsky 4,576,453 discloses a contact lens having a gradient colored central area.

Negle 3,034,403 discloses a contact lens having an opaque central area.

Kai C. Su 4,553,975 discloses the use of reactive dyes to color transparent contact lenses.

Knapp 4,582,402 discloses a method of coloring contact lenses having an iris pattern formed by intermittent opaque markings.

(Neefe) U.S. Pat. Nos. 4,460,523 and 4,472,327 describe methods of making cosmetic contact lenses wherein the lens segments are joined vertically through the lens.

THE DYED EYE COLOR CHANGE CONTACT LENS FUNCTIONS AS FOLLOWS:

A soft hydrophilic contact lens made by lathing, molding or spin casting and is dyed the desired color in the iris area. The lens at this point will not lighten or provide a color change when placed on a dark eye. In order to provide color change qualities, barium sulfate is precipitated within the lens matrix making the colored lens iris area opaque. When the lens is placed on the eye the opaque colored iris area will change the apparent color of the eye. The central pupil area and the peripheral lens area are transparent. The peripheral area is clear and colorless; the pupil area is transparent and may be clear or colored.

SUMMARY OF THE INVENTION

The invention comprises a corneal contact lens comprising a transparent pupil section, an iris section surrounding said pupil section, and a colored, opaque pattern deposited over said entire iris section, thereby providing a lens capable of coloring the structure of the iris of a person wearing said lens. The colored pattern should be undiscernable to the ordinary viewer at a distance of two feet or greater.

Figure 1:
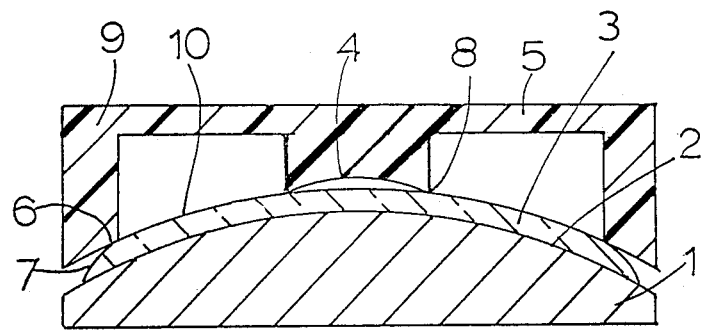
FIG. 1 shows the lens support in section, convex lens surface up.
Figure 2:
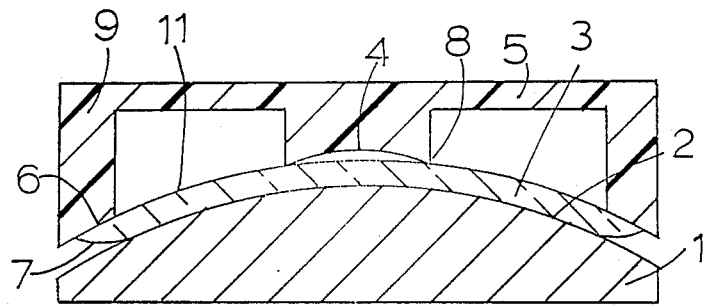
FIG. 2 shows the lens support in section, concave surface up.

THE COSMETIC LENS IS MADE AS FOLLOWS:

The lens 3 FIG. 1 is placed on the convex surface 2 FIG. 1 of the lens support 1 FIG. 1. The dye mask 9 FIG. 1 is fitted over the convex surface 10 FIG. 1. The pupil mask 8 FIGS. 1 and 2 has a concave radius 4 FIGS. 1 and 2 which is shorter than convex lens radius. The peripheral zone mask 6 FIGS. 1 and 2 provides the clear peripheral lens zone. The assembled dye device is placed in the dye solution and the dye is allowed to combine with the lens material in the convex iris area 10 FIG. 1 which is not protected by the mask segments 6 and 4 FIG. 1. The convex lens surface 10 FIG. 1 is exposed to the dye and absorbs the color on the convex lens surface 10 FIG. 1. At this stage of completion the lens has a transparent colored iris area and will not change the color of a dark eye.

EXAMPLE OF USABLE DYES:

The color additives are formed by reacting one or more reactive dyes with poly (hydroxyethl methacrylate); so that the sulfate group of the dye is replaced by an ether linkage to the poly (hydroxyethyl methacrylate).

(1) Reactive Black 5 [2,7-naptha-lenedisulfonic acid, 4-amino-5-hydroxy-3,6-bis((4-((2-(sulfooxy)ethyl)sulfonyl)phenyl)azo)-tetrasodium salt] (CAS Reg. No. 17095-24-8);

(2) Reactive Blue 21 [copper, (29H,31H-phtalocyaninato(2-)-$N^{29},N^{30},N^{31},N^{32}$)-, sulfo((4-((2-sulfooxy)ethyl)sulfonyl)phenyl)amino)sulfonyl derivs] (CAS Reg. No. 73049-92-0);

(3) Reactive Orange 78 [2-naphtha-lenesulfonic acid, 7-(acetylamino)-4-hydroxy-3((4-((2-(sulfooxy)ethyl)-sulfonyl) phenyl)azo)-] (CAS Reg. No. 68189-39-9);

(4) Reactive Yellow 15 [benzensulfonic acid, 4-(4,5-dihydro-4-((2-methoxy-5-methyl-4-((2-(sulfooxy)ethyl)sulfonyl) phenyl)azo)-3-methyl-5-oxo-1H-pyrazol-1-yl)-] (CAS Reg. No. 60958-41-0); and (5) Reactive Blue No. 19 [2-anthracene-sulfonic acid, 1-amino-9,10-dihydro-9,10-dioxo-4-((3-((2-(sulfooxy)ethyl)sulfonyl) phenyl)amino)-, disodium salt] (CAS Reg. No. 2580-78-1).

As part of the manufacturing process, the lenses containing the color additives are thoroughly washed to remove unbound reactive dyes.

These are examples only as other dyes can be used with equal results.

Some examples of these dyes, taken from the Color Index, Volume 5, Third Edition include;

| Commercial Name | | C.I. Generic Name |
|---|---|---|
| Brilliant Blue B | HOE | C.1. Reactive Blue 27 |
| Brilliant Violet 4R | HOE | C.1. Reactive Violet 27 |
| Turquoise FC3A | HST | C.1. Reactive Blue 91 |
| Brilliant Green 3GL | FBy | C.1. Reactive Green 9 |
| Brilliant Green 1B | FBy | C.1. Reactive Green 2 |
| Brown 5RL | BAY | C.1. Reactive Brown 4 |
| Dark Brown P-BRA | BAY | C.1. Reactive Brown 24 |
| Red Violet E-2BL | BAY | C.1. Reactive Violet 7 |
| Orange G | CFM | C.1. Reactive Orange 32 |
| Red B | CGY | C.1. Reactive Red 65 |
| Violet 3B | CGY | C.1. Reactive Violet 34 |
| Yellow 6G | CGY | C.1. Reactive Yellow 126 |

In general, the formation of a covalent bond between the lens material and the reactive dyestuff is effected by contacting of the dyestuff formulation with the lens material until reaction is complete.

ADDING OPAQUE WHITE TO THE CONCAVE LENS SURFACE:

The colored soft lens is inverted by pressing the convex lens surface causing it to become the concave lens surface. The inverted lens 3 FIG. 2 is placed on the convex lens support 1 FIG. 2. The tapered lens edge 7 FIG. 1 is now inverted 7 FIG. 2, having the taper adjacent to the convex lens support 1 FIG. 2.

Figure 3:
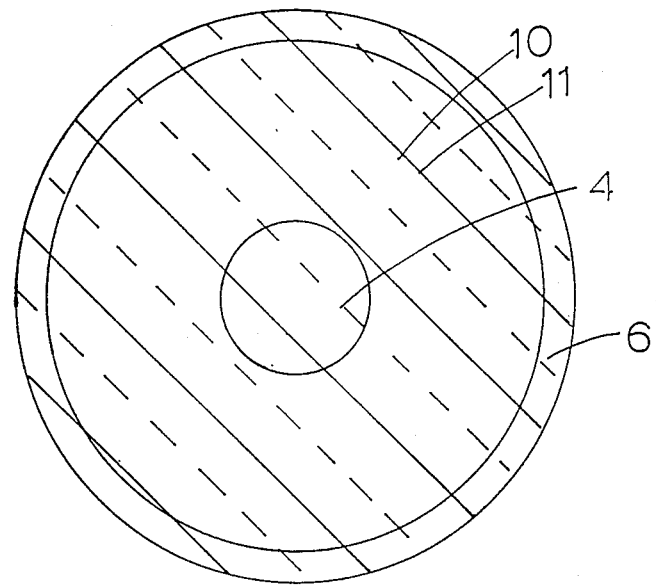
FIG. 3 shows the finished cosmetic lens from the front.
Figure 4:
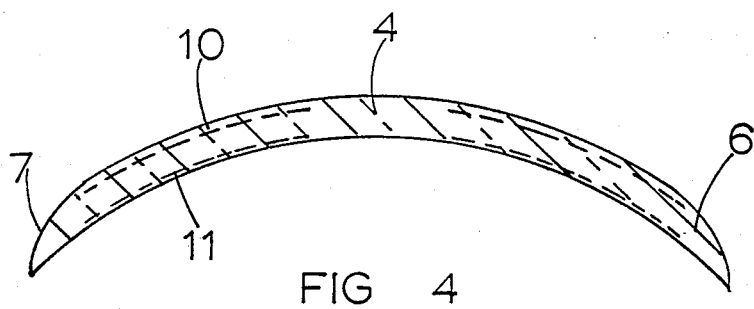
FIG. 4 shows the finished cosmetic lens in section.

The lens and the dye mask is placed in a solution of 2% to 20% barium chloride and water by weight, a small amount (0.3% to 1.0% by weight) sodium bicarbonate may be added to the barium chloride solution as a buffer. The inverted lens in the dye mask is placed in the barium chloride solution and the barium chloride is allowed to penetrate into the iris segment of the inverted lens. The lens and dye mask is removed from the barium chloride solution and placed in diluted sulphuric acid solution of from 0.02% to 10.0% concentrated sulphuric acid by weight. The sulphuric acid is allowed to react with the soluble barium chloride to form insoluble white barium sulfate. Barium sulfate renders the iris area opaque white. The lens is washed to remove all unreacted chemicals and placed on a dark brown eye. The dark brown eye will now appear a color determined by the color of the dye used in step one. FIG. 3 shows the finished lens 11 FIG. 3 from the front having an opaque iris area 10 FIG. 3, a clear peripheral area 6 FIG. 3 and transparent pupil area 4 FIG. 3. A colored transparent pupil can be provided by adding the colored dye to the iris area 10 FIG. 3 and the pupil area 4 FIG. 3 and adding the barium sulfate to the iris area 10 FIG. 3 only. FIG. 4 shows the finished lens in section. The transparent colored iris area on the convex lens surface 10 FIG. 4 surrounding the pupil area 4 FIG. 4 and a clear peripheral area 6 FIG. 4. The edge taper 7 FIG. 4 indicates the lens is not inverted. The white barium sulfate is on the concave surface 11 FIG. 4. Light entering the lens passes through the colored iris area surface 10 FIG. 4 and is reflected by the white opaque surface 11 FIG. 4 and passes through the transparent colored area 10 FIG. 4 a second time upon leaving the lens. The iris area will have the apparent color of the transparent color present on the convex lens surface through which the white opaque concave surface is seen.

For economic reasons, it is preferable to treat the polymerized material with the dyestuff preparation. However, it would also be possible to treat a monomer with dyes prior to polymerization, and to polymerize the dyestuff-monomer mixture.

Some of the opaque compounds which may be used to practice the invention are Zink Oxide, Tin Oxide, Titanium Dioxide and Barium Sulphate.

Figure 5:
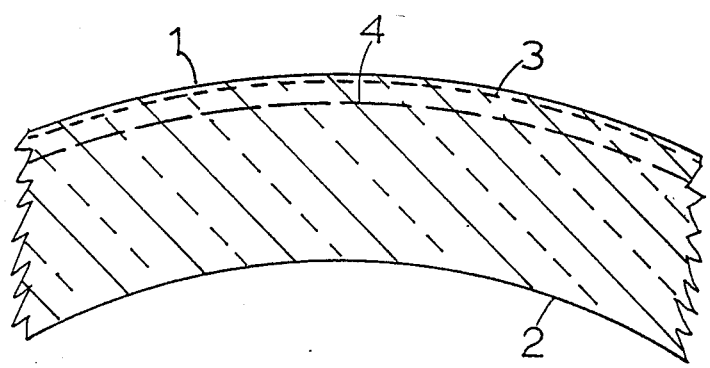

Another method of providing a cosmetic lens to change the apparent eye color may be made by the following method. The lens is placed in the dye fixture as shown in FIG. 1. Both the dye color and the opaque material are on the convex lens surface 1 FIG. 5. The dye color is allowed to penetrate only a small distance into the convex lens surface 3 FIG. 5, a distance of from 0.0001 to 0.005 of a millimeter has been used. The opaque material 4 FIG. 5 is allowed to penetrate deeper into the convex lens surface 1 FIG. 5, a distance from 0.002 to 0.05 of a millimeter has been used. The opaque material 4 FIG. 5 is placed behind the transparent colored surface layer by placing it further from the convex lens surface 1 FIG. 5 and deeper within the lens structure. An apparent eye color change is provided as the light colored, light reflecting layer 4 FIG. 5 is seen through the transparent colored surface layer 3 FIG. 5. The concave lens surface 2 FIG. 5 is not colored. In order to place the light reflecting layer deeper in the lens, a swelling agent is added to the solution to be precipitated. Swelling agents cause the pores of the hydrogel lens to become engorged allowing the precipitating solution to penetrate deeper into the lens structure 4 FIG. 5 and below the surface dye layer 3 FIG. 5.

Examples of useful super swelling agents are:

Ethyl Alcohol

Urea

Butanol

Methanol

Methyl Sulfoxide

Dimethyl Formamide

The swelling agents are used in the precipitating solution in amounts ranging from 0.5% to 50% by weight.

The lenses are stored in the gel state in a normal saline solution (0.9% sodium chloride). The super swelling agents cause the lens surface to swell greatly enlarging the surface pores thus allowing the precipitating solution to move into the lens behind the dyed surface layer.

An additional advantage of the inventive lenses is the fact that many of the dyestuffs used for tinting the lens tend to absorb ultraviolet, visible and infared readiation, particularly of the wave-lengths shown to be harmful to the eye.

It is understood that the invention is not limited to the exact details of construction shown and described herein for obvious modifications will occur to persons skilled in the art.

I claim:

1. A method of making a cosmetic contact lens that changes the apparent color of the eye by the steps of dying the iris area of the convex lens surface the desired transparent color, allowing the dye solution to penetrate 0.0001 to 0.005 of a millimeter into the convex lens surface, removing the lens from the dye solution, preparing a solution of a soluble salt which may be precipitated to form an insoluble light reflecting precipitant, adding a swelling agent to the soluble salt precipitating solution, allowing the swelling agent and precipitating salt solution to swell the lens convex surface and penetrate the iris area of the lens convex surface from 0.002 to 0.05 of a millimeter, removing the lens from the precipitating salt and swelling agent solution, allowing the precipitating salt in the convex lens surface to be precipiated forming an insoluble light reflecting layer which is further from the convex lens surface than the colored transparent dye layer.

2. A method as in claim 1 wherein the precipitating salt is barium chloride.

3. A method as in claim 1 wherein the insoluble precipitant is titanium dioxide.

4. A method as in claim 1 wherein the insoluble precipitant is tin oxide.

5. A method as in claim 1 wherein the insoluble precipitant is barium sulphate.

6. A method as in claim 1 wherein the swelling agent is ethyl alcohol.

7. A method as in claim 1 wherein the swelling agent is urea.

8. A method of making a cosmetic contact lens that changes the apparent color of the eye by the steps of dying the iris area of the convex lens surface the desired transparent color, removing the lens from the dye solution, preparing a solution of a soluble salt which may be precipitated to form an insoluble light reflecting precipitant, adding a swelling agent to the salt precipitating solution, allowing the swelling agent and precipitating salt solution to swell the lens convex surface and penetrate the iris area of the convex lens surface, removing the lens from the precipitating salt and swelling agent solution, allowing the precipitating salt in the convex lens surface to be precipitated forming an insoluble light reflecting layer which is further from the convex lens surface than the colored transparent surface dye.

9. A method as in claim 8 wherein the precipitating salt is barium chloride.

10. A method as in claim 8 wherein the insoluble precipitant is tin oxide.

11. A method as in claim 8 wherein the insoluble precipitant is barium sulphate.

12. A method as in claim 8 wherein the swelling agent is ethyl alcohol.

13. A method as in claim 8 wherein the swelling agent is urea.

14. A method of making a cosmetic contact lens that changes the apparent color of the eye by the steps of, dying the convex lens surface a desired transparent color, preparing a solution of a soluble salt which may be precipitated to form an insoluble light reflecting precipitant, allowing the precipitating salt solution to penetrate into the iris area of the convex lens surface, removing the lens from the precipitating salt solution, allowing the precipitating salt to be precipitated forming an insoluble light reflecting layer which is further from the convex lens surface than the colored transparent surface dye layer.

15. A method as in claim 14 wherein the precipitating salt is barium chloride.

16. A method as in claim 14 wherein the insoluble precipitant is tin oxide.

17. A method as in claim 14 wherein the insoluble precipitant is barium sulphate.

* * * * *